(12) United States Patent
Gao et al.

(10) Patent No.: US 12,261,696 B2
(45) Date of Patent: Mar. 25, 2025

(54) TRANSMISSION MODE INDICATION METHOD AND DEVICE, BASE STATION, TERMINAL

(71) Applicant: DATANG MOBILE COMMUNICATIONS EQUIPMENT CO., LTD., Beijing (CN)

(72) Inventors: Xueyuan Gao, Beijing (CN); Xin Su, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 420 days.

(21) Appl. No.: 17/641,428

(22) PCT Filed: Jun. 28, 2020

(86) PCT No.: PCT/CN2020/098427
§ 371 (c)(1),
(2) Date: Mar. 8, 2022

(87) PCT Pub. No.: WO2021/063044
PCT Pub. Date: Apr. 8, 2021

(65) Prior Publication Data
US 2022/0337344 A1   Oct. 20, 2022

(30) Foreign Application Priority Data

Sep. 30, 2019   (CN) .................. 201910943913.X

(51) Int. Cl.
*H04W 4/00* (2018.01)
*H04L 1/08* (2006.01)
*H04L 5/00* (2006.01)

(52) U.S. Cl.
CPC .............. *H04L 1/08* (2013.01); *H04L 5/0048* (2013.01); *H04L 5/0053* (2013.01)

(58) Field of Classification Search
USPC ........................................ 370/329, 330, 328
See application file for complete search history.

(56) References Cited

U.S. PATENT DOCUMENTS

2019/0052344 A1   2/2019  Kundargi et al.
2019/0268795 A1*  8/2019  Wu ...................... H04W 24/10
(Continued)

FOREIGN PATENT DOCUMENTS

CN      107302415 A      10/2017
CN      109787663 A      5/2019
(Continued)

OTHER PUBLICATIONS

Qualcomm Incorporated, "Multi-TRP Enhancements", 3GPP TSG-RAN WG1 Meeting #98, Aug. 26-30, 2019, Prague, Czech Republic, total 32 pages, R1-1909272.
(Continued)

*Primary Examiner* — Chuong T Ho
(74) *Attorney, Agent, or Firm* — Kilpatrick Townsend & Stockton LLP

(57) ABSTRACT

A transmission mode indication method and device, a base station, a terminal and a storage medium are provided. The method includes: transmitting signaling to a UE, and the UE determines a transmission mode between the UE and a base station according to the signaling, the signaling carrying indication information of a transmission configuration indicator (TCI) state, indication information of a redundancy version (RV), indication information of a demodulation reference signal (DMRS) port, and indication information indicating whether the number of retransmission is carried; or, besides the described indication information, the signal- (Continued)

ing also carrying indication information of a transmission mode. In the embodiments of the present application, indication information is carried in signaling and is used for indicating a specific transmission mode, and dynamic switching between different transmission modes can be achieved, and the system performance, the reliability and the resource utilization rate are better improved.

16 Claims, 7 Drawing Sheets

(56) References Cited

U.S. PATENT DOCUMENTS

| | | | |
|---|---|---|---|
| 2020/0015200 A1 | 1/2020 | Vilaipornsawai et al. | |
| 2020/0221487 A1* | 7/2020 | Lee | H04L 5/0091 |
| 2021/0219327 A1* | 7/2021 | Jiang | H04L 1/0031 |
| 2021/0368534 A1* | 11/2021 | Sato | H04L 1/0003 |
| 2022/0167385 A1* | 5/2022 | Takeda | H04L 1/1671 |
| 2022/0167389 A1* | 5/2022 | Kim | H04L 1/08 |
| 2022/0173866 A1* | 6/2022 | Wang | H04J 13/0077 |
| 2022/0174708 A1* | 6/2022 | Kim | H04W 72/0446 |
| 2022/0286868 A1* | 9/2022 | Kim | H04L 1/06 |
| 2022/0330282 A1* | 10/2022 | Kim | H04W 72/1263 |
| 2023/0239864 A1* | 7/2023 | Kim | H04W 72/23 370/329 |
| 2024/0187196 A1* | 6/2024 | Kim | H04L 1/1819 |

FOREIGN PATENT DOCUMENTS

| | | |
|---|---|---|
| CN | 109831232 A | 5/2019 |
| CN | 110022615 A | 7/2019 |
| CN | 110535570 A | 12/2019 |
| CN | 110535590 A | 12/2019 |
| CN | 110690948 A | 1/2020 |
| EP | 3534651 A1 | 9/2019 |
| EP | 3627910 A1 | 3/2020 |
| WO | 2018027822 A1 | 2/2018 |
| WO | 2018058447 A1 | 4/2018 |

OTHER PUBLICATIONS

Huawei et al., "Summary of Remaining Issues and Agreements for Enhancements on MultiTRP/panel transmission", 3GPP TSG RAN WG1 Meeting #98, Prague, Czech Republic, Aug. 26-30, 2019, total 7 pages, R1-1909603.

NEC, "Discussion on multi-TRP operation", 3GPP TSG RAN WG1 #96bis, Xi'an, China, Apr. 8-12, 2019, total 7 pages, R1-1904663.

Huawei et al., "Reliability/robustness enhancement with multi-TRP/panel", 3GPP TSG RAN WG1 meeting #97, Reno, USA, May 13-17, 2019, total 10 pages, R1-1906039.

Huawei et al., "Summary of Evaluation Results for Multi-TRP transmission with Enhanced Reliability", 3GPP TSG RAN WG1 meeting #96b, Reno, USA, May 13-17, 2019, total 41 pages, R1-1907707.

Huawei et al., "Summary of AI: 7.2.8.2 Enhancements on Multi-TRP/Panel Transmission of Offline Discussion", 3GPP TSG RAN WG1 Meeting #97, Reno, USA, May 13-17, 2019, total 66 pages, R1-1907706.

OPPO, "Enhancements on multi-TRP and multi-panel transmission", 3GPP TSG RAN WG1 Meeting #98bis, Chongqing, China, Oct. 14-20, 2019, total 13 pages, R1-1910116.

Korean Intellectual Property Office, Office Action Issued in Application No. 10-2022-7008942, Jun. 12, 2024, 7 pages.

Huawei et al., "Summary of Enhancements on Multi-TRP/Panel Transmission", 3GPP TSG RAN WG1 Meeting #98, Prague, Czech Republic, Aug. 26-30, 2019, total 76 pages, R1-1909602.

CATT, "Considerations on multi-TRP/panel transmission", 3GPP TSG RAN WG1 Meeting #98, Prague, CZ, Aug. 26-30, 2019, total 28 pages, R1-1908602.

* cited by examiner

Transmitting signaling to a terminal UE, causing the UE to determine a transmission mode between the UE and a base station based on the signaling; wherein the signaling carries indication information of a transmission configuration indicator (TCI) state, indication information of a redundancy version (RV), indication information of a demodulation reference signal (DMRS) port, and indication information of whether a number of retransmission is carried — S301

FIG. 3

Receiving signaling transmitted by a base station, and determining a transmission mode between the UE and the base station based on the signaling, wherein the signaling carries indication information of a transmission configuration indicator (TCI) state, indication information of a redundancy version (RV), indication information of a demodulation reference signal (DMRS) port, and indication information of whether a number of retransmission is carried — S401

FIG. 4

TRANSMISSION MODE INDICATION METHOD AND DEVICE, BASE STATION, TERMINAL

CROSS-REFERENCE TO RELATED APPLICATIONS

The present application claims priority to Chinese Application No. 201910943913X filed on Sep. 30, 2019, entitled "Methods and Devices for Indicating transmission mode, Base station, Terminal and Storage medium", which is hereby incorporated by reference in its entirety.

FIELD

The present application relates to the field of communication, in particular to a method for indicating a transmission mode, a device, a base station, a terminal and a storage medium.

BACKGROUND

Currently, there are mainly several typical application scenarios for Ultra Reliable Low Latency Communications (URLLC) business requirements, including Augmented Reality (AR) or Virtual Reality (VR) entertainment industry, industrial automation, traffic control requirements including remote driving, and power distribution control requirements. These URLLC businesses have higher requirements for reliability, delay, and performance. In the R16 research stage, we hope to better improve the transmission performance of URLLC for the application of multi-TRP (Transmission Reception Point) or PANEL-based coordinated multi-point transmission technology.

The URLLC business has very higher Quality of Service (QOS) quality requirements, and many businesses require a block error rate of more than $10^{-4}$. In the scenario of transmitting by multiple TRP or PANEL base stations, the channel fading situation for each TRP or PANEL after reaching a UE may be quite different. The problem of channel fading becomes more prominent with the high frequency, as the wavelength is greatly reduced, and the channel fading and blocking will seriously reduce the quality of TRP transmission or even cause impossible normal transmission. In order to ensure the reliability requirements for URLLC to support various scenarios, a more effective transmission scheduling strategy is needed to changefully ensure the reliability requirements.

However, there is no method for indicating different transmission modes under the URLLC business.

SUMMARY

Due to the problem above in the traditional methods, the embodiments of the present application provide a transmission mode indication method, a device, a base station, a terminal, and a storage medium.

According to a first aspect, an embodiment of the present application provides a method for indicating a transmission mode, including:
  transmitting signaling to a terminal UE, and the UE determines a transmission mode between the UE and a base station based on the signaling;
  and the signaling carries indication information of a transmission configuration indicator (TCI) state, indication information of a redundancy version (RV), indication information of a demodulation reference signal (DMRS) port, and indication information indicating whether a number of retransmission is carried.

According to a second aspect, an embodiment of the present application further provides a method for indicating a transmission mode, including:
  receiving signaling transmitted by a base station, and determining a transmission mode between the UE and the base station based on the signaling;
  and the signaling carries indication information of a transmission configuration indicator (TCI) state, indication information of a redundancy version (RV), indication information of a demodulation reference signal (DMRS) port, and indication information indicating whether a number of retransmission is carried.

According to a third aspect, an embodiment of the present application further provides a device for indicating a transmission mode, including:
  a signaling transmitter configured to transmit signaling to a terminal UE, and the UE determines a transmission mode between the UE and a base station based on the signaling;
  and the signaling carries indication information of a transmission configuration indicator (TCI) state, indication information of a redundancy version (RV), indication information of a demodulation reference signal (DMRS) port, and indication information indicating whether a number of retransmission is carried.

According to a fourth aspect, an embodiment of the present application further provides a device for indicating a transmission mode, including:
  a signaling receiver configured to receive signaling transmitted by a base station, and determine a transmission mode between the UE and the base station based on the signaling;
  and the signaling carries indication information of a transmission configuration indicator (TCI) state, indication information of a redundancy version (RV), indication information of a demodulation reference signal (DMRS) port, and indication information indicating whether a number of retransmission is carried.

According to a fifth aspect, an embodiment of the present application provides a base station, including a memory, a processor, and computer programs stored on the memory and executable on the processor, the computer programs, in case that executed by the processor, causes the processor to implement following steps including:
  transmitting signaling to a terminal UE, and the UE determines a transmission mode between the UE and a base station based on the signaling;
  and the signaling carries indication information of a transmission configuration indicator (TCI) state, indication information of a redundancy version (RV), indication information of a demodulation reference signal (DMRS) port, and indication information indicating whether a number of retransmission is carried.

According to a sixth aspect, an embodiment of the present application provides a terminal, including a memory, a processor, and computer programs stored on the memory and executable on the processor, the computer programs, in case that executed by the processor, causes the processor to implement following steps including:
  receiving signaling transmitted by a base station, and determining a transmission mode between the UE and the base station based on the signaling;
  and the signaling carries indication information of a transmission configuration indicator (TCI) state, indication information of a redundancy version (RV), indication information of a demodulation reference signal (DMRS) port, and indication information indicating whether a number of retransmission is carried.

According to a seventh aspect, the present application provides a non-transitory computer readable storage medium storing computer programs that cause the computer to perform the methods for indicating a transmission mode described above.

According to an eighth aspect, the present application further provides a non-transitory computer readable storage medium storing computer programs that cause the computer to perform the methods for indicating a transmission mode described above.

In the embodiments of the present application, indication information is carried in signaling which is used for indicating a specific transmission mode, and dynamic switching between different transmission modes can be achieved, and the system performance, the reliability and the resource utilization rate are better improved.

BRIEF DESCRIPTION OF THE DRAWINGS

The embodiments of the present application or the prior art, the drawings used in the descriptions of the embodiments or the prior art will be briefly described below. It should be noted that, the drawings in the following description are only some embodiments of the present application, and other drawings can be obtained according to these.

FIG. 3 is a schematic flowchart of a method for indicating a transmission mode at a base station side according to an embodiment of the present application;

FIG. 4 is a schematic flowchart of a method for indicating a transmission mode at a terminal side according to an embodiment of the present application;

DETAILED DESCRIPTION

The specific embodiments of the present application are further described in detail below with reference to the drawings. The following embodiments are only used to illustrate the present application more clearly, and cannot be used to limit the protection scope of the present application.

Alternatively, in the R16 research stage, coordinated multi-point transmission technology for multi-TRP or PANEL mainly includes the following:

1) Multi-TRP or PANEL Transmission Technology

The application of multi-TRP or PANEL in a base station is mainly to improve coverage of a cell edge, provide a more balanced quality of service in the service area, and coordinate data transmission among multi-TRP or PANEL in different ways. From the perspective of network morphology, network deployment with a large number of distributed access points and baseband centralized processing will be more conducive to providing a balanced user experience rate, and significantly reducing the delay and signaling overhead caused by handover. In the high frequency band, an antenna array of each TRP can be divided into several relatively independent antenna panels, and the shape and number of ports of the entire array panel can be flexibly adjusted based on deployment scenarios and business requirements. The antenna panels or TRPs can also be connected by optical fibers to facilitate more flexible distributed deployment. Through the cooperation between multi-TRPs or panels to transmit or receive multiple beams from multiple angles, various occlusion or blocking effects may be better overcome and the robustness of link connections is ensured, which is suitable for enhancing transmission quality of the URLLC businesses and meets reliability requirements.

2) URLLC Enhancement Schemes Based on Multi-Point Cooperative Transmission

The currently available URLLC enhancement schemes based on multi-point coordinated transmission include the following schemes:

Scheme 1 Spatial Division Multiplexing (SDM): on overlapping time-frequency resources in a slot, each transmission occasion (referring to a signal transmitted by a TRP on a resource) corresponds to an associated Transmission Configuration Indicator (TCI) state and a set of data layers of a set of Demodulation reference signal (DMRS) ports.

Figure 1:
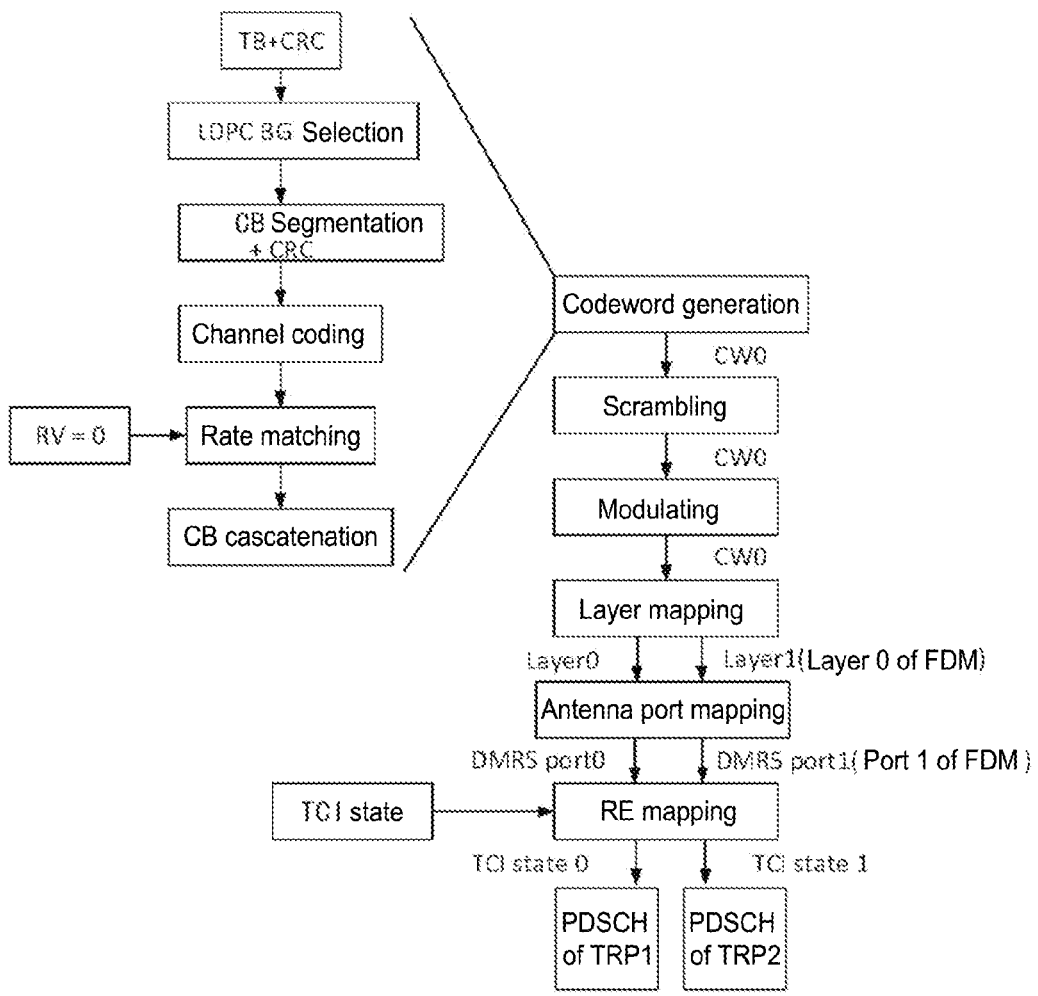
FIG. 1 is a schematic flowchart of a single RV transmission mode according to the prior art.

Scheme 1a: supporting a single Redundancy Version (RV) transmission mode. That is, different layers of data of the same TB are simultaneously transmitted through different TRPs and mapped on the same time-frequency resource. The process is shown in FIG. 1.

Figure 2:
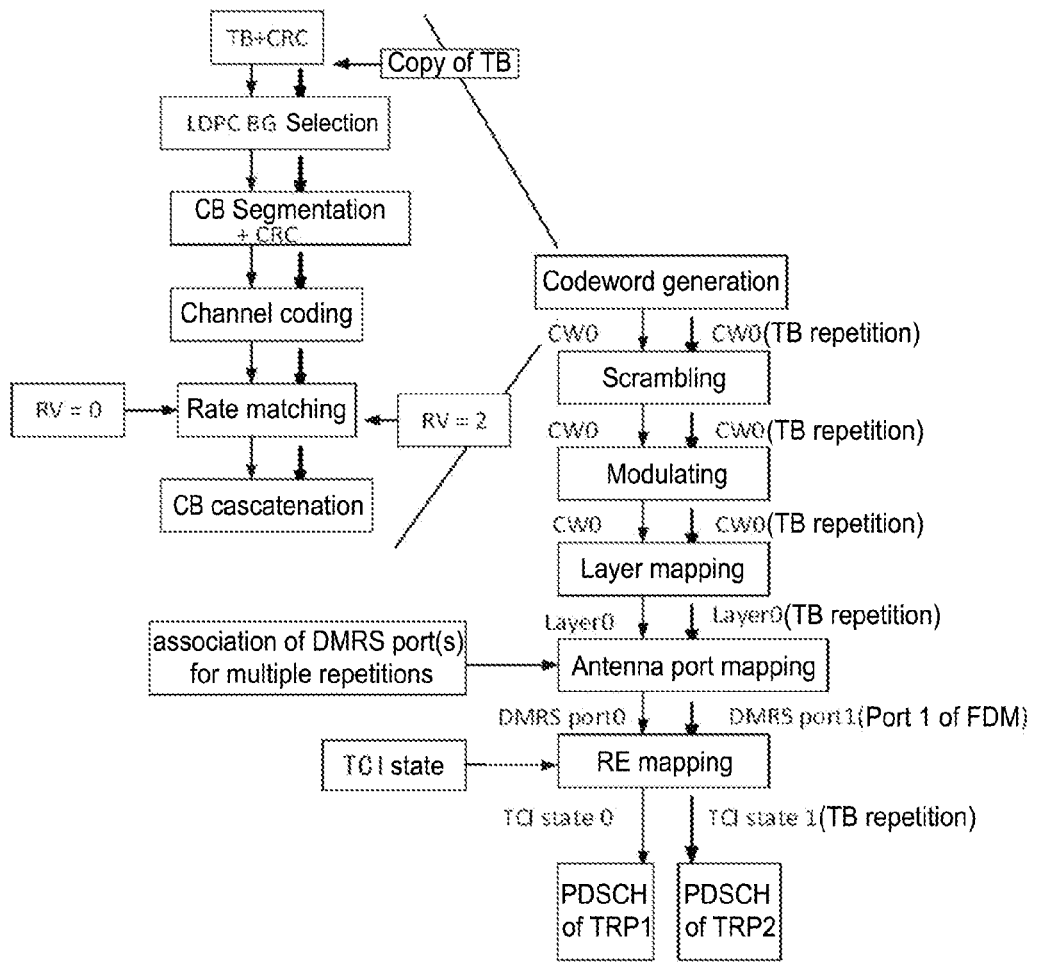
FIG. 2 is a schematic flowchart of a multi-RV transmission mode according to the prior art.

Scheme 1b: supporting a multi-RV transmission mode. That is, the data having different RV versions of the same TB are independently transmitted on different TRPs through different layers and mapped on the same time-frequency resource. The process is shown in FIG. 2.

Scheme 2 Frequency Division Multiplexing (FDM): in a slot, each frequency domain resource is associated with a TCI state, and respective frequency domain resources do not overlap each other.

Scheme 2a: supporting a single RV transmission mode. That is, the data of the same TB are simultaneously transmitted on different TRPs through different layers and mapped on the different frequency domain resources that do not overlap each other. The process is shown in FIG. 1.

Scheme 2b: supporting a multi-RV transmission mode. That is, different RV versions of the same TB are independently transmitted through different TRPs and mapped on the different frequency domain resources that do not overlap each other. The process is shown in FIG. 2.

Regardless of the SDM scheme or the FDM scheme, for a single RV transmission mode, part of the data of an encoding block corresponding to the RV is transmitted on each TRP, which is not a complete encoding block. Therefore, the received data on each TRP cannot be decoded separately. Data from different TRPs of different layers can be decoded only after these data are completely received. For the multi-RV transmission mode, the coding blocks having different RV versions of the same TB are transmitted on different TRPs, and a receiving terminal can combine the data from the coding block having different RV versions transmission mode of this transmission at a network side, and the transmission mode is also determined in the same way at a terminal side.

Differences between configurations of main parameters in various transmission modes are shown in Table 1.

TABLE 1

URLLC transmission modes

| Transmission mode | rvid1 | rvid2 | TCI states | Number of DMRS CDM groups | Number of retransmission |
|---|---|---|---|---|---|
| SDM-a | rvid1 | / | TCI state 0, TCI state 1 | 2 | / |
| SDM-b | rvid1 | rvid2 | TCI state 0, TCI state 1 | 2 | / |
| FDM-a | rvid1 | / | TCI state 0, TCI state 1 | 1 | / |
| FDM-b | rvid1 | rvid2 | TCI state 0, TCI state 1 | 1 | / |
| SDM or FDM rollback single TRP | rvid1 | / | TCI state 0 | 1 | / |
| TDM-3 | rvid1 or (RV_offset1) | rvid2 or (RV_offset2) | TCI state 0, TCI state 1 | 1 | K1 |
| TDM-3 rollback single TRP | rvid1 or (RV_offset1) | / | TCI state 0 | 1 | K1 |
| TDM-4 | rvid1 or (RV_offset1) | rvid2 or (RV_offset2) | TCI state 0, TCI state 1 | 1 | K2 |
| TDM-4 rollback single TRP | rvid1 or (RV_offset1) | / | TCI state 0 | 1 | K2 | based on the UE capability before decoding and then decode them. Therefore, compared with the same time-frequency resource allocation, the single RV scheme has lower coding rate and higher coding gain. The multi-RV transmission has an advantage that the data transmitted on each TRP can be decoded individually or in combination and gains are combining to offset the impact brought by the increase in coding rate.

Scheme 3 (TDM3 with a mini-slot level): in a slot, each time domain resource is associated with a TCI state, and respective time domain resources do not overlap each other. One of the time domain resources refers to a group of mini slots (each group may have only one mini slot). Time Division Multiplexing (TDM) includes TDM3 (intra-slot time division multiplexing) and TDM4 (inter-slot time division multiplexing).

Scheme 4 (TDM4 with a slot level): each time domain resource is associated with a TCI state, and respective time domain resources do not overlap each other. One of the time domain resources refers to a group of slots (each group may have only one slot).

According to the present application, the configuration for various control signaling is used to support the reliability transmission scheme URLLC business during coordinated transmission between multi-TRPs or PANELs, and a method for switching and scheduling under different transmission modes is provided.

In case that configuring URLLC businesses having a high requirement for latency, SDM or FDM scheme is generally used for transmission. For URLLC businesses having a low requirement for latency or a terminal has a limited receiving capabilities, TDM can be used for transmission.

In case that the multi-TRPs based reliable transmission URLLC is realized through different spatial, or frequency, or time-domain resource multiplexing schemes (SDM, or FDM, or TDM), the following method is used to specify the The network uses dynamic indications of the TCI codepoints of signaling to distinguish the number of TCI states used for the current transmission, to determine whether it is a single TRP transmission mode or a multi-TRP coordinated transmission mode, and a dynamic switching can be supported between the single TRP transmission mode and the multi-point TRP coordinated transmission by configuring TCI codepoints.

FIG. 3 shows a schematic flowchart of a method for indicating a transmission mode at a base station side according to an embodiment of the present application, which includes:

step 301, transmitting signaling to a terminal UE, to cause the UE to determine a transmission mode between the UE and a base station based on the signaling;

the signaling carries indication information of a transmission configuration indicator (TCI) state, indication information of a redundancy version (RV), indication information of a demodulation reference signal (DMRS) port, and indication information of whether the number of retransmission is carried.

Alternatively, signaling carrying indication information is transmitted from a base station side to a UE after configuring the transmission mode for the base station and the UE. The indication information includes at least TCI status, RV and DMRS ports, and may or may not carry the number of retransmission.

In the embodiments of the present application, indication information is carried in signaling and is used for indicating a specific transmission mode, and dynamic switching between different transmission modes can be achieved, and the system performance, the reliability and the resource utilization rate are better improved.

Further, on the basis of the foregoing method embodiment, the signaling further carries indication information of the transmission mode.

It should be noted that in case that the signaling only carries the indication information of the TCI status, RV and DMRS port and whether to carry the number of retransmission, the transmission mode between the base station and the UE as shown in Table 1 may be determined through various specific parameters. In case that the signaling carries the indication information of the transmission mode, the transmission mode between the base station and the UE as shown in Table 1 may be conveniently determined in combination with the indication information of the TCI status, RV, and DMRS port carried in the signaling, and whether the number of retransmission is carried.

Further, on the basis of the foregoing method embodiment, in case that the TCI state is a first preset value, the signaling further carries indication information of whether a physical downlink shared channel (PDSCH) currently transmitted by the UE adopting the time division multiplexing (TDM) transmission mode.

Alternatively, as shown in Table 1, the TCI state includes the following two kinds: only one state and two states. In case that the first preset value is 2, that is, in case that the TCI state is 2, the signaling carries the indication information of whether the PDSCH currently transmitted by the UE adopting the TDM transmission mode.

In case that the TCI state is 1, the determination process is continued as follows:
- if the signaling carries the number of retransmission (K1 or K2), the transmission needs to be repeated K1 times within a slot or K2 times between the slots according to the single TRP transmission mode; and
- if the signaling does not carry the number of retransmission, PDSCH is transmitted on the TRP indicated by the TCI state as the transmission point.

In case that the TCI state is 2, it is necessary to obtain the multiplexing mode of the PDSCH through other indications, that is, one of SDM-a, or SDM-b, or FDM-a, or FDM-b, or TDM3, or TDM4 in Table 1.

Further, indication information of whether a physical downlink shared channel (PDSCH) currently transmitted by the UE adopting the time division multiplexing (TDM) transmission mode may include:
- indication information indicating that the PDSCH currently transmitted by the UE does not adopt the TDM transmission mode and allocation information of the DMRS port; or
- indication information indicating that the PDSCH currently transmitted by the UE adopts the TDM transmission mode and the number of retransmission, in case that the signaling is radio resource control (RRC) signaling.

Further, in case that the signaling carries the indication information of the number of retransmission,
- the number of retransmission is indicated based on a set of K1 parameters and a set of K2 parameters carried by the RRC signaling and K1 and K2 configured by Media Access Control-Control Element (MAC-CE); or
- the number of retransmission is indicated based on whether a higher layer signaling is configured with K1 corresponding to TDM3, or whether the higher layer signaling is configured with K2 corresponding to TDM4.

Alternatively, in case that the TCI state is 2, it is necessary to obtain the multiplexing mode of the PDSCH through other indications, that is, one of SDM-a, or SDM-b, or FDM-a, or FDM-b, or TDM3, or TDM4 in Table 1.

The network uses the following signaling to distinguish a specific multiplexing mode in the multi-TRP transmission mode, that is, one of SDM, or FDM, or TDM3, or TDM4.

Through signaling, the network indicates UE whether the PDSCH currently transmitted by the UE adopts the slot or mini-slot aggregation TDM transmission mode, and which TDM transmission mode (TDM3 or TDM4) is adopted. If the TDM transmission mode is not adopted, SDM or FDM transmission mode is adopted, that is, SDM or FDM mode or TDM3 or TDM4.

The number of retransmission for TDM 3 can be configured as K1 times by the network, and the number of retransmission for TDM 4 can be configured as K2 times.

For example, K1 and K2 are configured through the following manner:
RRC Configuration+MAC-CE Activation:
the set of K1 and the set of K2 are configured through RRC signaling. For example, the set of K1 includes {−1}, {2}, {4}, and the set of K2 includes {−1}, {2}, {4}, {8}. {−1} can indicate an invalid number of times, which means that the configuration is not performed. Before the PDSCH dynamic scheduling transmission starts, K1={−1}, K2={8} are further selected by MAC-CE, which means that this PDSCH transmission uses a TDM4 transmission mode, the number of retransmission is 8.

If K1 corresponding to TDM3 is selected as {−1} through the MAC-CE configuration, and K2 corresponding to TDM4 is selected as {−1}, then the SDM or FDM transmission mode is adopted for the corresponding PDSCH transmission.

An example of configuration based on RRC is as follows:
If K1 corresponding to TDM3 is not configured, and K2 corresponding to TDM4 is configured as 8 through RRC signaling, the UE is notified that the current transmission mode is TDM4 and the number of retransmission is 8.

If K1 corresponding to TDM3 is not configured, and K2 corresponding to TDM4 is not configured by RRC signaling, then the corresponding PDSCH is transmitted by the SDM or FDM transmission mode.

Further, on the basis of the foregoing method embodiment, in case that the TCI state is a second preset value, the signaling carries indication information of the spatial division multiplexing (SDM), or frequency division multiplexing (FDM), or intra-slot time division multiplexing TDM3, or inter-slot time division multiplexing TDM4 transmission mode used by the current PDSCH and configured by a higher layer signaling.

It should be noted that the second preset value and the first preset value in this embodiment may be the same, that is, both may be 2, that is, the TCI state is two states.

Further, in case that the signaling carries the indication information of the TDM3 or TDM4 transmission mod,
- the signaling carries the indication information of the number of retransmission, or
- the number of retransmission within the slot under TDM3 are predetermined for the base station and the UE, respectively.

Further, on the basis of the foregoing method embodiment, the signaling carrying indication information of the number of retransmission may include:
- the signaling carrying the indication information of the number of retransmission configured by a higher layer signaling, or the signaling being DCI signaling, and the DCI signaling adding indication information of the number of retransmission in the time domain resource allocation (TDRA) or RV codepoint.

Alternatively, through higher layer signaling, the network directly indicates that the current multiplexing mode of PDSCH transmission is one of SDM, or FDM, or TDM3, or TDM4, to perform switching among these transmission modes.

If the transmission mode is TDM3 or TDM4, the network simultaneously configures the number of retransmission (K1 or K2) through signaling.

The number of retransmission can be indicated by higher layer signaling;
- the number of retransmission can be dynamically indicated by means of DCI signaling, for example, can be indicated by adding indication of the number of retransmission in TDRA or RV codepoint; and
- the number of retransmission can also be obtained through other implicit methods, for example, directly specifying the number of retransmission of TDM3 within the slots.

Further, on the basis of the embodiments mentioned above,
- the signaling is DCI signaling, and the DCI signaling carries indication information of the RV or RV combination configured by a higher layer signaling that corresponds to the TCI state in a one-to-one manner; or
- the signaling carries indication information of the RV and/or RV combination predefined or configured by a higher layer signaling that corresponds to RV codepoints; or
- the signaling carries indication information of RV and RV_offset, where the RV_offset is a value of a start position of the RV transmission basic sequence configured by the higher layer signaling; or
- the signaling carries indication information of RV, and the default value of RV_offset is predetermined on the base station and the UE side, respectively.

Further, in case that the signaling carries indication information of the RV and/or RV combination predefined or configured by a higher layer signaling that corresponds to RV codepoints,
- if the signaling carries the indication information of the SDM or FDM transmission mode, the RV codepoint includes the RV value used for the single RV transmission mode and the RV combination used for the multi-RV transmission mode; and
- if the signaling carries indication information of the TDM3 or TDM4 transmission mode, the RV codepoint includes RV or RV_offset for a single TCI state, and RV combination or RV_offset combination for TCI states.

Further, on the basis of the foregoing method embodiment, in case that the signaling carries indication information of RV and RV_offset,
- if the signaling carries indication information of the SDM, or FDM, or TDM transmission mode, RV1 is indicated based on RV, and RV2 is indicated based on RV1 and RV_offset;
- and, RV1 and RV2 have a one-to-one correspondence with the transmitting occasion corresponding to the TCI states indicated in the TCI codepoints;
- if the signaling carries indication information of the TDM3 or TDM4 transmission mode, RV1 or RV_offset1 is indicated based on RV1, and RV2 is indicated based on RV1 and RV_offset; and RV_offset2 is indicated based on RV1 and RV_offset;
- and, the RV sequences obtained based on RV_offset1 and RV_offset2 have a one-to-one correspondence with the transmitting occasion corresponding to the TCI states indicated in the TCI codepoints.

Alternatively, there are three methods for indicating RV or RV combination:

Method 1: configuring, by a higher layer signaling, the RV (or RV_offset) or the available RV combination (or RV_offset combination) corresponding to different TCI states in the DCI signaling, and having a one-to-one correspondence with the TCI states.

Method 2: predefining or configuring, by a higher layer signaling, the available RV (or RV_offset) and/or the available RV combination (or RV_offset combination), and corresponding them to different RV codepoints.

The base station dynamically indicates the RV codepoint through DCI signaling, to correspond to a RV or RV sequence start position RV_offset, or RV configuration {RV1, RV2} or a combination {RV_offset1, RV_offset2} of RV start positions RV_offset, and has a one-to-one correspondence with TCI states in the TCI codepoints.

For the SDM, or FDM transmission mode, the RV codepoint indicated here includes the RV value that can be used for a single RV transmission mode (SDM-a, or FDM-a, or single TRP) and RV combination used for multi-RV transmission mode (SDM-b, or FDM-b), which are pre-defined or notified by higher layer signaling.

For TDM3 or TDM4 transmission mode, the RV codepoint indicated here includes the RV or the start position RV_offset of RV transmission basic sequence that can be used for a single TCI state, and a RV combination or start position RV_offset combination of the RV transmission basic sequence used for TCI states, which are pre-defined or notified by higher layer signaling.

Method 3: indicating RV and RV_offset through signaling. RV_offset is the default value or notified by higher layer signaling.

For SDM, or FDM, or TDM transmission mode, an RV or a group of RV configuration {RV1,RV2} is obtained, RV1=RV, and RV2 is obtained through RV2=mod(RV1+RV_offset,4), and has a one-to-one correspondence with the transmitting occasion corresponding to the TCI states indicated in the TCI codepoints. For example: in case that the RV_offset is configured as 0, the multi-RV transmission scheme is supported and RV of the two TCI states in two corresponding TCI codepoints is configured as RV1=RV2. If RV_offset itself is not in a range of 0-3, such as RV_offset=−1, it means that only a single RV is configured.

For TDM3 or TDM4 transmission mode, RV_offset1=RV1 can also be used, and RV_offset2 is obtained by using RV_offset2=mod(RV1+RV_offset,4) and RV sequences obtained from the start positions have a one-to-one correspondence with the transmitting occasion corresponding to the TCI states indicated in the TCI codepoints. For example: in case that the RV_offset is configured as 0, the multi-RV transmission scheme is supported and RV of the two TCI states in two corresponding TCI codepoints is configured as RV_offset1=RV_offset2. If RV_offset itself is not in a range of 0-3, such as RV_offset=−1, it means that only a single RV_offset1 is configured.

According to the present embodiment, in the SDM, or FDM, or TDM reliability enhancement solution based on multi-point coordination, by configuring the corresponding relationship between TCI codepoints and RV, different transmission modes may be dynamically switched at the same time, and the reliability and utilization rate of resources may be better improved.

FIG. 4 shows a schematic flowchart of a method for indicating a transmission mode on a terminal side according to an embodiment of the present application, which includes:

step 401, receiving signaling transmitted by a base station, and determining a transmission mode between the UE and the base station based on the signaling;

the signaling carries indication information of a transmission configuration indicator (TCI) state, indication information of a redundancy version (RV), indication information of a demodulation reference signal (DMRS) port, and indication information of whether the number of retransmission is carried.

Further, the signaling further carries the indication information of the transmission modes.

Further, in case that the TCI state is a first preset value, the signaling further carries indication information of whether a physical downlink shared channel (PDSCH) currently transmitted by the UE adopting the time division multiplexing (TDM) transmission mode.

Further, indication information of whether a physical downlink shared channel (PDSCH) currently transmitted by the UE adopting the time division multiplexing (TDM) transmission mode may include:

indication information indicating that the PDSCH currently transmitted by the UE does not adopt the TDM transmission mode and allocation information of the DMRS port; or indication information indicating that the PDSCH currently transmitted by the UE adopts the TDM transmission mode and the number of retransmission, in case that the signaling is radio resource control (RRC) signaling.

Further, the number of retransmission is indicated based on a set of K1 parameters and a set of K2 parameters carried by the RRC signaling and corresponding K1 and K2 configured by a media access control-control element (MAC-CE); or the number of retransmission is indicated based on whether a higher layer signaling is configured with K1 corresponding to TDM3, or whether the higher layer signaling is configured with K2 corresponding to TDM4.

Further, in case that the TCI state is a second preset value, the signaling carries indication information of the spatial division multiplexing (SDM), or frequency division multiplexing (FDM), or intra-slot time division multiplexing TDM3, or inter-slot time division multiplexing TDM4 transmission mode used by the current PDSCH and configured by a higher layer signaling.

Further, in case that the signaling carries the indication information of the TDM3 or TDM4 transmission mod, the signaling carries the indication information of the number of retransmission, or the number of retransmission within the slot under TDM3 are predetermined on the base station and the UE, respectively.

Further, the signaling carries the indication information of the number of retransmission, which includes:

the signaling carrying the indication information of the number of retransmission configured by a higher layer signaling, or the signaling being DCI signaling, and the DCI signaling adding indication information of the number of retransmission in the time domain resource allocation (TDRA) or RV codepoint.

Further, the signaling is DCI signaling, and the DCI signaling carries indication information of the RV or RV combination configured by a higher layer signaling that corresponds to the TCI state in a one-to-one manner; or the signaling carries indication information of the RV and/or RV combination predefined or configured by a higher layer signaling that corresponds to RV codepoints; or the signaling carries indication information of RV and RV_offset, where the RV_offset is a value of a start position of the RV transmission basic sequence configured by the higher layer signaling; or the signaling carries indication information of RV, and the default value of RV_offset is predetermined on the base station and the UE side, respectively.

Further, in case that the signaling carries indication information of the RV and/or RV combination predefined or configured by a higher layer signaling that corresponds to RV codepoints, if the signaling carries the indication information of the SDM or FDM transmission mode, the RV codepoint includes the RV value used for the single RV transmission mode and the RV combination used for the multi-RV transmission mode; and if the signaling carries indication information of the TDM3 or TDM4 transmission mode, the RV codepoint includes RV or RV_offset for a single TCI state, and RV combination or RV_offset combination for TCI states.

Further, in case that the signaling carries the indication information of RV and RV_offset, if the signaling carries indication information of the SDM, or FDM, or TDM transmission mode, RV1 is indicated based on RV, and RV2 is indicated based on RV1 and RV_offset;

and, RV1 and RV2 have a one-to-one correspondence with the transmitting occasion corresponding to the TCI states indicated in the TCI codepoints;

if the signaling carries indication information of the TDM3 or TDM4 transmission mode, RV1 or RV_offset1 is indicated based on RV1, and RV2 is indicated based on RV1 and RV_offset; and RV_offset2 is indicated based on RV1 and RV_offset;

and, the RV sequences obtained based on RV_offset1 and RV_offset2 have a one-to-one correspondence with the transmitting occasion corresponding to the TCI states indicated in the TCI codepoints.

The method for indicating the transmission mode on the terminal side described in this embodiment corresponds to the above-mentioned method for indicating the transmission mode on the base station side.

Figure 5:
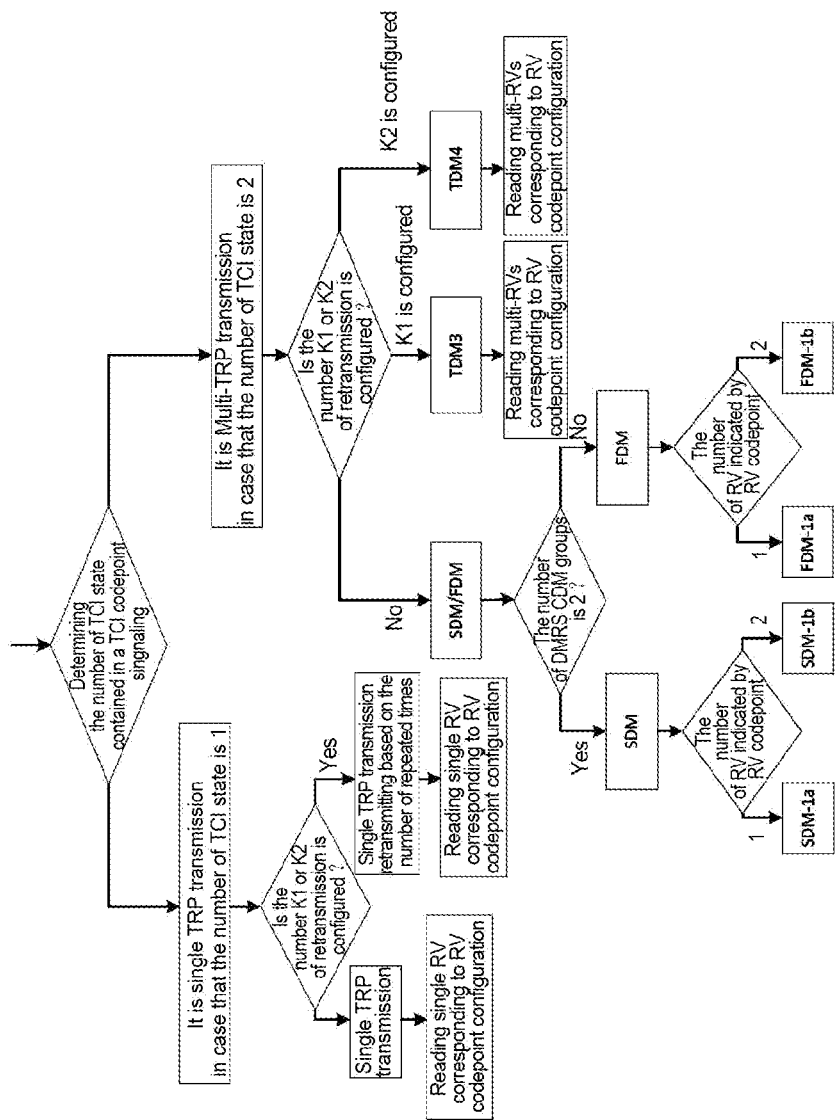
FIG. 5 is a schematic flowchart for determining a transmission mode according to an embodiment of the present application.

Alternatively, after the UE receives the signaling transmitted by the base station, the determination is performed based on the indication information carried in the signaling, as shown in FIG. 5, in case that the TCI state is 1, then the determination continues:

if the signaling carries the number of retransmission (K1 or K2), the transmission needs to be repeated K1 times within the slots or K2 times between the slots according to the single TRP transmission mode; and if the signaling does not carry the number of retransmission, PDSCH is transmitted according to the TRP indicated by the TCI state as the transmission point.

In case that the TCI state is 2, it is necessary to obtain the multiplexing mode of the PDSCH through other indications, that is, one of SDM-a, or SDM-b, or FDM-a, or FDM-b, or TDM3, or TDM4 in Table 1.

The network uses the following signaling to distinguish a specific multiplexing mode in the multi-TRP transmission mode, that is, one of SDM, or FDM, or TDM3, or TDM4, which includes a method 1 and a method 2.

Method 1:

Through signaling, the network indicates UE whether the PDSCH currently transmitted by the UE adopts the slot or mini-slot aggregation TDM transmission mode, and which TDM transmission mode (TDM3 or TDM4) is adopted. If the TDM transmission mode is not adopted, SDM or FDM transmission mode is adopted, that is, SDM, or FDM mode, or TDM3, or TDM4.

The number of retransmission for TDM 3 can be configured as K1 times by the network, and the number of retransmission for TDM 4 can be configured as K2 times.

Figure 6:
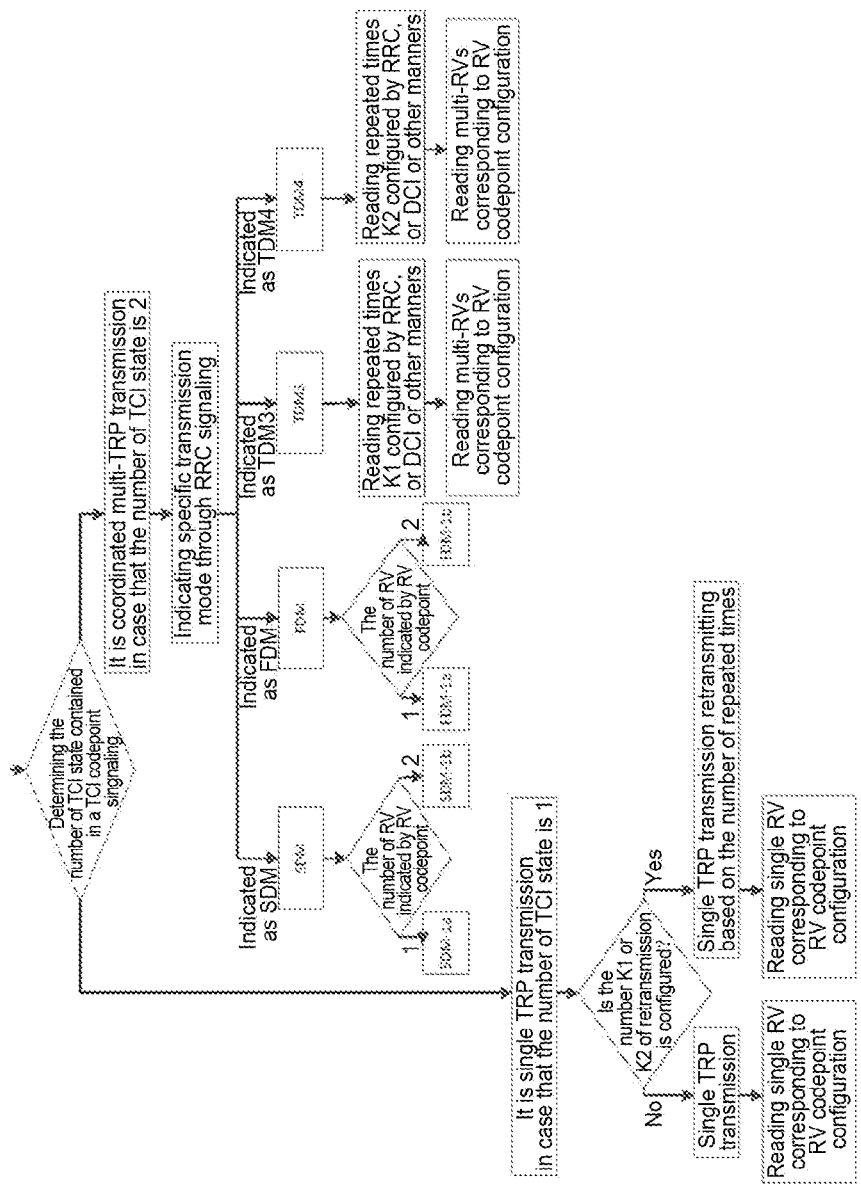
FIG. 6 is a schematic flowchart for determining a transmission mode according to another embodiment of the present application.

For example, it is implemented by means of RRC configuration, as shown in FIG. 6, which may include:

RRC Configuration+MAC-CE Activation:
the set of K1 and the set of K2 are configured through RRC signaling. For example, the set of K1 includes {-1}, {2}, {4}, and the set of K2 includes {-1}, {2}, {4}, {8}, where {-1} can indicate an invalid number of times, which means that the configuration is not performed. Before the PDSCH dynamic scheduling transmission starts, K1={-1}, K2={8} are further selected by MAC-CE, which means that this PDSCH transmission uses a TDM4 transmission mode, the number of retransmission is 8.

If K1 corresponding to TDM3 is selected as {-1} through the MAC-CE configuration, and K2 corresponding to TDM4 is selected as {-1}, then the SDM or FDM transmission mode is adopted for the corresponding PDSCH.

RRC configuration:

If K1 corresponding to TDM3 is not configured, and K2 corresponding to TDM4 is configured as 8 through RRC signaling, the UE is notified that the current transmission mode is TDM4 and the number of retransmission is 8.

If K1 corresponding to TDM3 is not configured, and K2 corresponding to TDM4 is not configured by RRC signaling, then the corresponding PDSCH is transmitted by the SDM or FDM transmission mode.

If it is not the TDM3 or TDM4 mode, the network uses the DMRS port allocation information indicated by the signaling to further distinguish whether the transmission is whether a SDM mode or an FDM mode.

If the DMRS port configuration belongs to two CDM groups, respectively, the SDM transmission mode is adopted, otherwise the FDM transmission is adopted.

For example, in case that the DMRS port information indicates {0, 2}, it is determined that the transmission mode corresponds to SDM. Similarly, in case that the DMRS port information indicates {0}, if it is determined that it is not in TDM mode, the transmission mode is determined to be FDM.

Method 2:

Through higher layer signaling, the network directly indicates that the current multiplexing mode of PDSCH transmission is one of SDM, or FDM, or TDM3, or TDM4, to perform switching between these transmission modes.

If the transmission mode is TDM3 or TDM4, the network simultaneously configures the number of retransmission (K1 or K2) through signaling.

The number of retransmission can be indicated by higher layer signaling;
the number of retransmission can be dynamically indicated by means of DCI signaling, for example, can be indicated by adding an indication of the number of retransmission in TDRA or RV codepoint; and
the number of retransmission can also be obtained through other implicit methods, for example, directly specifying the number of retransmission of TDM3 within the slots.

In addition, besides using signaling indication to distinguish a specific multiplexing mode in the multi-TRP transmission mode, the network also uses signaling to indicate the UE of RV (or RV sequence start values RV_offset) or available RV combination (or a combination of RV sequence start values RV_offset) that the PDSCH may use in TRP coordinated transmission.

For the multi-TRP coordinated SDM or FDM transmission mode, the RV configuration indicates a single RV or a combination of RVs, that is, the different multiplexing modes of a and b:
if the RV configuration indicates a single RV, it indicates the SDM-a, or FDM-a transmission mode; and
if the RV configuration indicates a combination of RV, it indicates the SDM-a, or FDM-a transmission mode; and two RV values included in the RV configuration may be the same or different, and which have one-to-one correspondence to the TCI state.

For the multi-TRP coordinated TDM-3 or TDM-4 transmission mode, if the RV configuration indicates RV combination or RV_offset combination, then different RVs or RV sequence values corresponding to different RV_offsets are applied to different transmitting occasions corresponding to each TCI state, and the configuration has a one-to-one correspondence with TCI states.

For the single TRP rollback transmission mode, the RV configuration indicates a single RV or the RV sequence start value RV_offset.

There are three methods for indicating RV or RV combination:

Method 1: configuring, by a higher layer signaling, the RV (or RV_offset) or the available RV combination (or RV_offset combination) corresponding to different TCI states in the DCI signaling, and having a one-to-one correspondence with the TCI states.

Method 2: predefining or configuring, by a higher layer signaling, the available RV (or RV offset) and/or the available RV combination (or RV offset combination), and corresponding them to different RV codepoints.

The base station dynamically indicates the RV codepoint through DCI signaling, to correspond to a RV or RV sequence start position RV_offset, or RV configuration {RV1, RV2} or a combination {RV_offset1, RV_offset2} of RV start positions RV_offset, and has a one-to-one correspondence with TCI states in the TCI codepoints.

For the SDM, or FDM transmission mode, the RV codepoint indicated here includes the RV values that can be used for a single RV the transmission mode (SDM-a, or FDM-a, or single TRP) and RV combination used for multi-RV transmission mode (SDM-b, or FDM-b), which are pre-defined or notified by higher layer signaling.

For TDM3 or TDM4 transmission mode, the RV codepoint indicated here includes the RV or the start position RV_offset of RV transmission basic sequence that can be used for a single TCI state, and a RV combination or start position RV_offset combination of the RV transmission basic sequence used for TCI states, which are pre-defined or notified by higher layer signaling.

For example, the following table 2 shows the set of available RVs. In case that the RV codepoint is 0-3, it shows that the current transmission is a single TRP transmission mode or a multi-TRP transmission mode (SDM-a, or FDM-a, or TDM) of a single RV; in case that the RV codepoint is equal to 4, multi-TRP transmission mode with the same RV (SDM-b, or FDM-b, or TDM) are supported; in case that the RV codepoint is greater than 4, multi-TRP transmissions mode (SDM-b, or FDM-b, or TDM) with different RVs are supported. Table 3 shows simplified options configured by the base station, but the above classification is also required. Configuration selected under a scenario can also meet the performance requirements. Compared with Table 3, the number of signaling bits can be saved.

TABLE 2 a set of multi-RVs

| RV index | RV1 or RV_offset1 | RV2 or RV_offset2 |
|---|---|---|
| 0 | 0 | NAN |
| 1 | 1 | NAN |
| 2 | 2 | NAN |
| 3 | 3 | NAN |
| 4 | 0 | 0 |
| 5 | 0 | 1 |
| 6 | 0 | 2 |
| 7 | 0 | 3 |
| 8 | 1 | 0 |
| 9 | 2 | 0 |
| 10 | 3 | 0 |
| 11 | 3 | 3 |
| ... | ... | ... |
| 15 | RESERVED | RESERVED |

TABLE 3 a set of multi- RVs

| RV index | RV1 | RV2 |
|---|---|---|
| 0 | 0 | NAN |
| 1 | 0 | 0 |
| 2 | 0 | 2 |
| 3 | 0 | 3 |

Method 3: indicating RV and RV_offset through signaling. RV_offset is the default value or notified by higher layer signaling.

For SDM, or FDM, or TDM transmission mode, an RV or a group of RV configuration {RV1, RV2} is obtained, RV1=RV, and RV2 is obtained through RV2=mod(RV1+RV_offset,4), which has a one-to-one correspondence with the transmitting occasion corresponding to the TCI states indicated in the TCI codepoints. For example: in case that the RV_offset is configured as 0, the multi-RV transmission scheme is supported and RV of the two TCI states in two corresponding TCI codepoints is configured as RV1=RV2. If RV_offset itself is not in a range of 0-3, such as RV_offset=−1, it means that only a single RV is configured.

For TDM3 or TDM4 transmission mode, RV_offset1=RV1 can also be used, and RV_offset2 is obtained by using RV_offset2=mod(RV1+RV_offset,4) and RV sequence obtained from the start position has a one-to-one correspondence with the transmitting occasion corresponding to the TCI states indicated in the TCI codepoints. For example: in case that the RV_offset is configured as 0, the multi-RV transmission scheme is supported and RV of the two TCI states in two corresponding TCI codepoints is configured as RV_offset1=RV_offset2. If RV_offset itself is not in a range of 0-3, such as RV_offset=−1, it means that only a single RV_offset1 is configured.

According to embodiments, methods for indicating different modes (SDM, or FDM, or TDM3, or TDM4) are implemented through signaling control and DMRS port allocation and respective transmission modes can be switched; at the same time, multiple transmission modes in SDM, FDM, and TDM transmission modes, including fallback mode supporting the from multi-TRP to single TRP, are dynamically switched through a design associating the RV version with the TCI codepoints and joint indication of the RV configuration and the TCI codepoints. In the SDM, or FDM, or TDM reliability enhancement solution based on multi-point coordination, by configuring the corresponding relationship between TCI codepoints and RV, different transmission modes may be dynamically switched, and the reliability and utilization rate of resources may be better improved.

Figure 7:
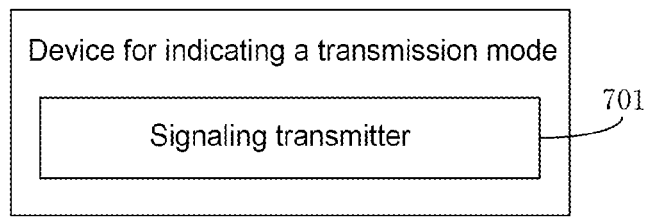
FIG. 7 is a schematic structural diagram of a device for indicating a transmission mode at a base station side according to an embodiment of the present application.

FIG. 7 is a schematic structural diagram of a device for indicating a transmission mode at a base station side according to an embodiment of the present application. The device includes a signaling transmitter 701.

The signaling transmitter 701 is configured to transmit signaling to a terminal UE, and the UE determines a transmission mode between the UE and a base station based on the signaling;

the signaling carries indication information of a transmission configuration indicator (TCI) state, indication information of a redundancy version (RV), indication information of a demodulation reference signal (DMRS) port, and indication information of whether the number of retransmission is carried.

The device for indicating a transmission mode described in the present embodiment can be used to execute the corresponding method embodiments described above, and principles and effects thereof are similar, and will not be repeated here.

Figure 8:
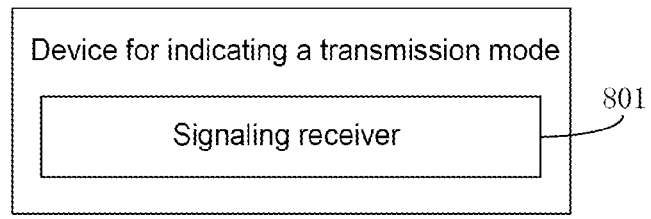
FIG. 8 is a schematic structural diagram of a device for indicating a transmission mode at a terminal side according to an embodiment of the present application.

FIG. 8 is a schematic structural diagram of a device for indicating a transmission mode on a terminal side according to an embodiment of the present application. The device includes: a signaling receiver 801.

The signaling receiver 801 is configured to receive signaling transmitted by a base station, and determine a transmission mode between the UE and the base station based on the signaling;

the signaling carries indication information of a transmission configuration indicator (TCI) state, indication information of a redundancy version (RV), indication information of a demodulation reference signal (DMRS) port, and indication information of whether the number of retransmission is carried.

The device for indicating a transmission mode described in the present embodiment can be used to execute the corresponding method embodiments described above, and principles and effects thereof are similar, and will not be repeated here.

Figure 9:
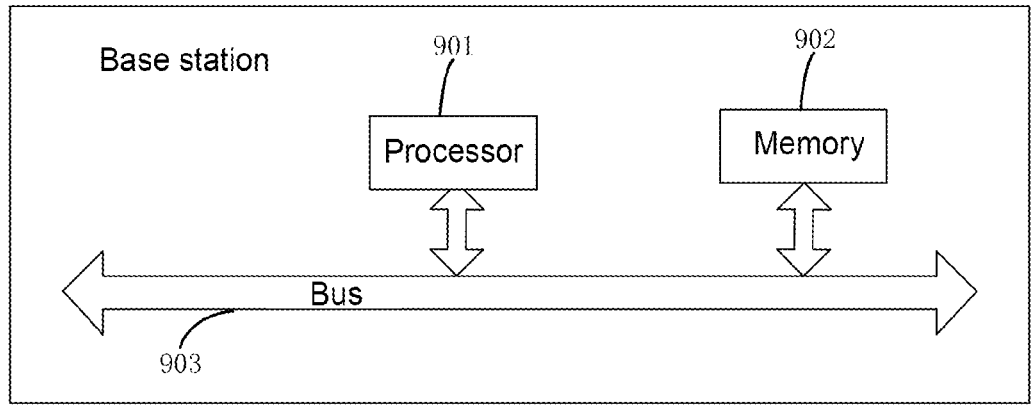
FIG. 9 is a logical block diagram of a base station according to an embodiment of the present application.

Referring to FIG. 9, the base station includes a processor 901, a memory 902 and a bus 903;

the processor 901 and the memory 902 communicate with each other through the bus 903;

the processor 901 is configured to call program instructions in the memory 902 to execute the following methods:

transmitting signaling to a terminal UE, and the UE determines a transmission mode between the UE and a base station based on the signaling;

the signaling carries indication information of a transmission configuration indicator (TCI) state, indication information of a redundancy version (RV), indication information of a demodulation reference signal (DMRS) port, and indication information indicating whether the number of retransmission is carried.

Further, on the basis of the foregoing embodiment, the signaling further carries indication information of the transmission mode.

Further, on the basis of the foregoing embodiment, in case that the TCI state is a first preset value, the signaling further carries indication information of whether a physical downlink shared channel (PDSCH) currently transmitted by the UE adopting the time division multiplexing (TDM) transmission mode.

Further, on the basis of the foregoing embodiment, indication information indicating whether a physical downlink shared channel (PDSCH) currently transmitted by the UE adopting the time division multiplexing (TDM) transmission mode may include:
   indication information indicating that the PDSCH currently transmitted by the UE does not adopt the TDM transmission mode and allocation information of the DMRS port; or
   indication information indicating that the PDSCH currently transmitted by the UE adopts the TDM transmission mode and the number of retransmission, in case that the signaling is radio resource control (RRC) signaling.

Further, on the basis of the embodiments mentioned above,
   the number of retransmission is indicated based on a set of K1 parameters and a set of K2 parameters carried by the RRC signaling and corresponding K1 and K2 configured by a media access control-control element (MAC-CE); or
   the number of retransmission is indicated based on whether a higher layer signaling is configured with K1 corresponding to TDM3, or whether the higher layer signaling is configured with K2 corresponding to TDM4.

Further, on the basis of the foregoing embodiment, in case that the TCI state is a second preset value, the signaling carries indication information of the spatial division multiplexing (SDM), or frequency division multiplexing (FDM), or intra-slot time division multiplexing TDM3, or inter-slot time division multiplexing TDM4 transmission mode used by the current PDSCH and configured by a higher layer signaling.

Further, on the basis of the foregoing embodiment, in case that the signaling carries indication information of the TDM3 or TDM4 transmission mode,
   the signaling carries the indication information of the number of retransmission, or
   the number of retransmission within the slot under TDM3 are predetermined for the base station and the UE, respectively.

Further, on the basis of the foregoing embodiment, the signaling carrying indication information of the number of retransmission may include:
   the signaling carrying the indication information of the number of retransmission configured by a higher layer signaling, or
   the signaling being DCI signaling, and the DCI signaling adding indication information of the number of retransmission in the time domain resource allocation (TDRA) or RV codepoint.

Further, on the basis of the embodiments mentioned above,
   the signaling is DCI signaling, and the DCI signaling carries indication information of the RV or RV combination configured by a higher layer signaling that corresponds to the TCI state in a one-to-one manner; or
   the signaling carries indication information of the RV and/or RV combination predefined or configured by a higher layer signaling that corresponds to RV codepoints; or
   the signaling carries indication information of RV and RV_offset, and the RV_offset is a value of a start position of the RV transmission basic sequence configured by the higher layer signaling; or
   the signaling carries indication information of RV, and the default value of RV_offset is predetermined on the base station and the UE side, respectively.

Further, on the basis of the foregoing embodiment, in case that the signaling carries indication information of the RV and/or RV combination predefined or configured by a higher layer signaling that corresponds to RV codepoints,
   if the signaling carries the indication information of the SDM or FDM transmission mode, the RV codepoint includes the RV value used for the single RV transmission mode and the RV combination used for the multi-RV transmission mode; and
   if the signaling carries indication information of the TDM3 or TDM4 transmission mode, the RV codepoint includes RV or RV_offset for a single TCI state, and RV combination or RV_offset combination for TCI states.

Further, on the basis of the foregoing embodiment, in case that the signaling carries indication information of RV and RV_offset,
   if the signaling carries indication information of the SDM, or FDM, or TDM transmission mode, RV1 is indicated based on RV, and RV2 is indicated based on RV1 and RV_offset;
   and, RV1 and RV2 have a one-to-one correspondence with the transmitting occasion corresponding to the TCI states indicated in the TCI codepoints;
   if the signaling carries indication information of the TDM3 or TDM4 transmission mode, RV1 or RV_offset1 is indicated based on RV1, and RV2 is indicated based on RV1 and RV_offset; and RV_offset2 is indicated based on RV1 and RV_offset;
   the RV sequences obtained based on RV_offset1 and RV_offset2 have a one-to-one correspondence with the transmitting occasion corresponding to the TCI states indicated in the TCI codepoints.

The base station described in this embodiment corresponds to the above-mentioned method for indicating a transmission mode on the base station side, and principles and technical effects thereof are similar, and will not be repeated here.

Figure 10:
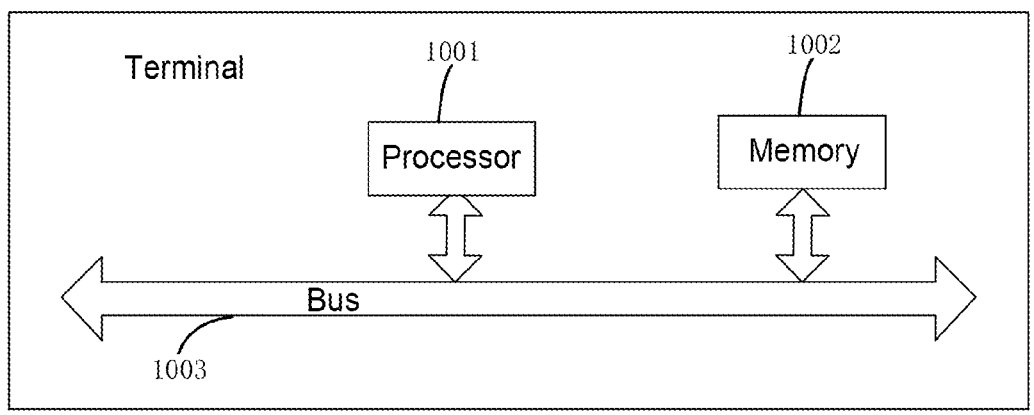
FIG. 10 is a logical block diagram of a base station according to an embodiment of the present application.

Referring to FIG. 10, the base station includes a processor 1001, a memory 1002 and a bus 1003;
   the processor 1001 and the memory 1002 communicate with each other through the bus 1003;
   the processor 1001 is configured to call program instructions in the memory 1002 to execute the following methods:
   receiving signaling transmitted by a base station, and determining a transmission mode between the UE and the base station based on the signaling;
   and the signaling carries indication information of a transmission configuration indicator (TCI) state, indication information of a redundancy version (RV), indication information of a demodulation reference signal (DMRS) port, and indication information of whether the number of retransmission is carried.

Further, on the basis of the foregoing embodiment, the signaling further carries indication information of the transmission mode.

Further, on the basis of the foregoing embodiment, in case that the TCI state is a first preset value, the signaling further carries indication information of whether a physical downlink shared channel (PDSCH) currently transmitted by the UE adopting the time division multiplexing (TDM) transmission mode.

Further, on the basis of the foregoing embodiment, indication information of whether a physical downlink shared channel (PDSCH) currently transmitted by the UE adopting the time division multiplexing (TDM) transmission mode includes:
  indication information indicating that the PDSCH currently transmitted by the UE does not adopt the TDM transmission mode and allocation information of the DMRS port; or
  indication information indicating that the PDSCH currently transmitted by the UE adopts the TDM transmission mode and the number of retransmission, in case that the signaling is radio resource control (RRC) signaling.

Further, on the basis of the embodiments mentioned above,
  the number of retransmission is indicated based on a set of K1 parameters and a set of K2 parameters carried by the RRC signaling and corresponding K1 and K2 configured by a media access control-control element (MAC-CE); or
  the number of retransmission is indicated based on whether a higher layer signaling is configured with K1 corresponding to TDM3, or whether the higher layer signaling is configured with K2 corresponding to TDM4.

Further, on the basis of the foregoing embodiment, in case that the TCI state is a second preset value, the signaling carries indication information of the spatial division multiplexing (SDM), or frequency division multiplexing (FDM), or intra-slot time division multiplexing TDM3, or inter-slot time division multiplexing TDM4 transmission mode used by the current PDSCH and configured by a higher layer signaling.

Further, on the basis of the foregoing embodiment, in case that the signaling carries indication information of the TDM3 or TDM4 transmission mode,
  the signaling carries the indication information of the number of retransmission, or
  the number of retransmission within the slot under TDM3 are predetermined on the base station and the UE, respectively.

Further, on the basis of the foregoing embodiment, the signaling carrying indication information of the number of retransmission may include:
  the signaling carrying the indication information of the number of retransmission configured by a higher layer signaling, or
  the signaling being DCI signaling for data centers interconnecting with each other, and the DCI signaling adding indication information of the number of retransmission in the time domain resource allocation (TDRA) or RV codepoint.

Further, on the basis of the embodiments mentioned above,
  the signaling is DCI signaling, and the DCI signaling carries indication information of the RV or RV combination configured by a higher layer signaling that corresponds to the TCI state in a one-to-one manner; or
  the signaling carries indication information of the RV and/or RV combination predefined or configured by a higher layer signaling that corresponds to RV codepoints; or
  the signaling carries indication information of RV and RV_offset, where the RV_offset is a value of a start position of the RV transmission basic sequence configured by the higher layer signaling; or
  the signaling carries indication information of RV, and the default value of RV_offset is predetermined on the base station and the UE side, respectively.

Further, on the basis of the foregoing embodiment, in case that the signaling carries indication information of the RV and/or RV combination predefined or configured by a higher layer signaling that corresponds to RV codepoints,
  if the signaling carries the indication information of the SDM, or FDM transmission mode, the RV codepoint includes the RV value used for the single RV transmission mode and the RV combination used for the multi-RV transmission mode; and
  if the signaling carries indication information of the TDM3 or TDM4 transmission mode, the RV codepoint includes RV or RV_offset for a single TCI state, and RV combination or RV_offset combination for TCI states.

Further, on the basis of the foregoing embodiment, in case that the signaling carries indication information of RV and RV_offset,
  if the signaling carries indication information of the SDM, or FDM, or TDM transmission mode, RV1 is indicated based on RV, and RV2 is indicated based on RV1 and RV_offset;
  and, RV1 and RV2 have a one-to-one correspondence with the transmitting occasion corresponding to the TCI states indicated in the TCI codepoints;
  if the signaling carries indication information of the TDM3 or TDM4 transmission mode, RV1 or RV_offset1 is indicated based on RV1, and RV2 is indicated based on RV1 and RV_offset; and RV_offset2 is indicated based on RV1 and RV_offset;
  and, the RV sequences obtained based on RV_offset1 and RV_offset2 have a one-to-one correspondence with the transmitting occasion corresponding to the TCI states indicated in the TCI codepoints.

The terminal described in this embodiment corresponds to the above-mentioned method for indicating a transmission mode on the terminal side, and principles and effects thereof are similar, and will not be repeated here.

An embodiment provides a computer program product including: a computer program stored on a non-transient computer readable storage medium, the computer program comprises program instructions, in case that executed by a computer, which cause the computer to perform the methods described above in the method embodiments.

An embodiment provides a non-transitory computer readable storage medium storing computer instructions that cause the computer to perform any of the methods described above in the method embodiments.

The device embodiments described above are merely illustrative, the units described as separate components may or may not be physically separate, and the components shown as units may or may not be physical units, that is, may be located at the same place, or it can be distributed to multiple network units. Some or all of the modules may be selected according to actual needs to achieve the purpose of the solution of the present embodiment.

Through the description of the embodiments above, the various embodiments can be implemented by means of software and a necessary general hardware platform, and of course, by hardware. Therefore, the above solutions can be embodied in the form of software products, which can be stored in a storage medium such as ROM, or RAM, magnetic Discs, optical discs, etc., including several instructions to cause a computer device (for example, a personal computer, server, or network device, etc.) to perform various embodiments or a part of the methods described in various embodiments.

What is claimed is:

1. A method for indicating a transmission mode, comprising:
　transmitting signaling to a user equipment (UE), wherein the signaling is configured for the UE to determine a transmission mode between the UE and a base station based on the signaling,
　wherein the signaling carries indication information of a transmission configuration indicator (TCI) state, indication information of a redundancy version (RV), indication information of a demodulation reference signal (DMRS) port, and indication information indicating whether the number of retransmission is carried;
　wherein the signaling further carries indication information of the transmission mode;
　in case that the TCI state is a first preset value, the signaling further carries indication information indicating whether a physical downlink shared channel (PDSCH) transmitted by the UE adopts time division multiplexing (TDM) transmission mode; or, in case that the TCI state is a second preset value, the signaling carries indication information of spatial division multiplexing (SDM), or frequency division multiplexing (FDM), or intra-slot time division multiplexing TDM3, or inter-slot time division multiplexing TDM4 transmission mode used by a PDSCH configured by a higher layer signaling.

2. The method of claim 1, wherein in case that the signaling carries indication information of TDM3 or TDM4 transmission mode,
　the signaling carries the indication information of the number of retransmission, or
　the number of retransmission within a slot under of TDM3 are predetermined for the base station and the UE, respectively.

3. The method of claim 2, wherein the signaling carrying indication information of the number of retransmission comprises:
　the signaling carrying the indication information of the number of retransmission configured by the higher layer signaling, or
　the signaling being downlink control information (DCI) signaling, and the DCI signaling adding indication information of the number of retransmission in time domain resource allocation (TDRA) or RV codepoint.

4. The method of claim 1, wherein
　the signaling carries indication information of the RV and/or RV combination predefined or configured by a higher layer signaling that corresponds to RV codepoint; or
　the signaling carries indication information of RV and RV_offset, wherein the RV_offset is a value of a start position of an RV transmission basic sequence configured by the higher layer signaling.

5. The method of claim 4, wherein in case that the signaling carries indication information of the RV and/or RV combination predefined or configured by the higher layer signaling that corresponds to RV codepoints,
　if the signaling carries the indication information of the SDM or FDM transmission mode, the RV codepoint includes RV value used for a single RV transmission mode and RV combination used for a multi-RV transmission mode; and
　if the signaling carries indication information of the TDM3 transmission mode, the RV codepoint includes RV for a single TCI state, and RV combination for a plurality of TCI states; or
　in case that the signaling carries the indication information of RV and RV_offset,
　if the signaling carries indication information of the TDM transmission mode, RV1 is indicated based on RV, and RV2 is indicated based on RV1 and RV_offset;
　wherein, RV1 and RV2 have a one-to-one correspondence with transmitting occasions corresponding to the TCI states indicated in the TCI codepoints;
　if the signaling carries indication information of the TDM4 transmission mode, RV_offset1 is indicated based on RV1, and RV2 is indicated based on RV1 and RV_offset; and RV_offset2 is indicated based on RV1 and RV_offset;
　wherein, the RV sequences obtained based on RV_offset1 and RV_offset2 have a one-to-one correspondence with the transmitting occasions corresponding to the TCI states indicated in the TCI codepoints.

6. A base station: comprising a processor, and a memory storing computer programs, that in case that executed by the processor, cause the processor to implement the method of claim 1.

7. A method for indicating a transmission mode, comprising:
　receiving signaling transmitted by a base station; and
　determining a transmission mode between a user equipment (UE) and the base station based on the signaling,
　wherein the signaling carries indication information of a transmission configuration indicator (TCI) state, indication information of a redundancy version (RV), indication information of a demodulation reference signal (DMRS) port, and indication information indicating whether the number of retransmission is carried;
　wherein the signaling further carries indication information of the transmission mode;
　in case that the TCI state is a first preset value, the signaling further carries indication information indicating whether a physical downlink shared channel (PDSCH) transmitted by the UE adopts time division multiplexing (TDM) transmission mode; or, in case that the TCI state is a second preset value, the signaling carries indication information of spatial division multiplexing (SDM), or frequency division multiplexing (FDM), or intra-slot time division multiplexing TDM3, or inter-slot time division multiplexing TDM4 transmission mode used by a PDSCH configured by a higher layer signaling.

8. The method of claim 7, wherein in case that the signaling carries indication information of TDM3 or TDM4 transmission mode,
　the signaling carries the indication information of the number of retransmission, or the number of retransmission within a slot under TDM3 are predetermined for the base station and the UE, respectively.

9. The method of claim 8, wherein the signaling carrying indication information of the number of retransmission, comprises:
the signaling carrying the indication information of the number of retransmission configured by the higher layer signaling, or
the signaling being downlink control information (DCI) signaling, and the DCI signaling adding indication information of the number of retransmission in time domain resource allocation (TDRA) or RV codepoint.

10. The method of claim 7, wherein
the signaling carries indication information of the RV and/or RV combination predefined or configured by a higher layer signaling that corresponds to RV codepoint; or
the signaling carries indication information of RV and RV_offset, wherein the RV_offset is a value of a start position of an RV transmission basic sequence configured by the higher layer signaling.

11. The method of claim 10, wherein in case that the signaling carries indication information of the RV and/or RV combination predefined or configured by the higher layer signaling that corresponds to RV codepoints,
if the signaling carries the indication information of the SDM or FDM transmission mode, the RV codepoint includes RV value used for a single RV transmission mode and RV combination used for a multi-RV transmission mode; and
if the signaling carries indication information of the TDM3 transmission mode, the RV codepoint includes RV for a single TCI state, and RV combination for a plurality of TCI states; or
in case that the signaling carries the indication information of RV and RV_offset,
if the signaling carries indication information of the TDM transmission mode, RV1 is indicated based on RV, and RV2 is indicated based on RV1 and RV_offset;
wherein, RV1 and RV2 have a one-to-one correspondence with transmitting occasions corresponding to the TCI states indicated in the TCI codepoints;
if the signaling carries indication information of the TDM4 transmission mode, RV_offset1 is indicated based on RV1, and RV2 is indicated based on RV1 and RV_offset; and RV_offset2 is indicated based on RV1 and RV_offset;
wherein, the RV sequences obtained based on RV_offset1 and RV_offset2 have a one-to-one correspondence with the transmitting occasions corresponding to the TCI states indicated in the TCI codepoints.

12. A terminal comprising: a processor and a memory storing computer programs, that in case that executed by the processor, cause the processor to implement following steps:
receiving signaling transmitted by a base station; and
determining a transmission mode between a user equipment (UE) and the base station based on the signaling;
wherein the signaling carries indication information of a transmission configuration indicator (TCI) state, indication information of a redundancy version (RV), indication information of a demodulation reference signal (DMRS) port, and indication information indicating whether the number of retransmission is carried;
wherein the signaling further carries indication information of the transmission mode;
in case that the TCI state is a first preset value, the signaling further carries indication information indicating whether a physical downlink shared channel (PDSCH) transmitted by the UE adopts time division multiplexing (TDM) transmission mode; or, in case that the TCI state is a second preset value, the signaling carries indication information of spatial division multiplexing (SDM), or frequency division multiplexing (FDM), or intra-slot time division multiplexing TDM3, or inter-slot time division multiplexing TDM4 transmission mode used by a PDSCH configured by a higher layer signaling.

13. The terminal of claim 12, wherein in case that the signaling carries indication information of TDM3 or TDM4 transmission mode,
the signaling carries the indication information of the number of retransmission, or
the number of retransmission within a slot under TDM3 are predetermined for the base station and the UE, respectively.

14. The terminal of claim 13, wherein the signaling carrying indication information of the number of retransmission, comprises:
the signaling carrying the indication information of the number of retransmission configured by the higher layer signaling, or
the signaling being downlink control information (DCI) signaling, and the DCI signaling adding indication information of the number of retransmission in time domain resource allocation (TDRA) or RV codepoint.

15. The terminal of claim 12, wherein
the signaling carries indication information of the RV and/or RV combination predefined or configured by a higher layer signaling that corresponds to RV codepoint; or
the signaling carries indication information of RV and RV_offset, wherein the RV_offset is a value of a start position of an RV transmission basic sequence configured by the higher layer signaling.

16. The terminal of claim 15, wherein in case that the signaling carries indication information of the RV and/or RV combination predefined or configured by the higher layer signaling that corresponds to RV codepoints,
if the signaling carries the indication information of the SDM or FDM transmission mode, the RV codepoint includes RV value used for a single RV transmission mode and RV combination used for a multi-RV transmission mode; and
if the signaling carries indication information of the TDM3 transmission mode, the RV codepoint includes RV for a single TCI state, and RV combination for a plurality of TCI states; or
in case that the signaling carries the indication information of RV and RV_offset,
if the signaling carries indication information of the TDM transmission mode, RV1 is indicated based on RV, and RV2 is indicated based on RV1 and RV_offset;
wherein, RV1 and RV2 have a one-to-one correspondence with transmitting occasions corresponding to the TCI states indicated in the TCI codepoints;
if the signaling carries indication information of the TDM4 transmission mode, RV_offset1 is indicated based on RV1, and RV2 is indicated based on RV1 and RV_offset; and RV_offset2 is indicated based on RV1 and RV_offset;
wherein, the RV sequences obtained based on RV_offset1 and RV_offset2 have a one-to-one correspondence with the transmitting occasions corresponding to the TCI states indicated in the TCI codepoints.

* * * * *